(12) United States Patent
Inoue et al.

(10) Patent No.: US 6,790,927 B2
(45) Date of Patent: Sep. 14, 2004

(54) OPTICAL POLYCARBONATE AND APPLICATIONS THEREOF

(75) Inventors: Kazushige Inoue, Moka (JP); Tomoaki Shimoda, Ichihara (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/117,756

(22) Filed: Apr. 5, 2002

(65) Prior Publication Data

US 2003/0032760 A1 Feb. 13, 2003

(30) Foreign Application Priority Data

May 28, 2001 (JP) ........................................ 2001-159441

(51) Int. Cl.[7] .............................................. C08G 64/00
(52) U.S. Cl. ...................... 528/196; 264/176.1; 264/219; 359/109; 359/642; 369/275; 369/275.1; 428/64; 528/198
(58) Field of Search .............................. 264/176.1, 219; 359/109, 642; 428/64; 528/196, 198; 369/275.1, 275

(56) References Cited

U.S. PATENT DOCUMENTS

| | | | |
|---|---|---|---|
| 4,371,660 A | 2/1983 | Calundann et al. | |
| 4,526,926 A | 7/1985 | Weber et al. | |
| 5,026,817 A | 6/1991 | Sakashita et al. | |
| 5,097,002 A | 3/1992 | Sakashita et al. | |
| 5,142,018 A | 8/1992 | Sakashita et al. | |
| 5,151,491 A | 9/1992 | Sakashita et al. | |
| 5,187,242 A | 2/1993 | Sakashita et al. | |
| 5,319,066 A | 6/1994 | King, Jr. | |
| 5,340,905 A | 8/1994 | Kühling et al. | |
| 5,399,659 A | 3/1995 | Kühling et al. | |
| 5,418,316 A | 5/1995 | Kühling et al. | |
| 5,606,007 A | 2/1997 | Sakashita et al. | |
| 5,652,313 A | 7/1997 | Kühling et al. | |
| 5,747,632 A | 5/1998 | Adachi et al. | 528/196 |
| 5,767,224 A | 6/1998 | Kühling et al. | |
| 5,942,594 A | 8/1999 | Nakae et al. | |
| 6,183,830 B1 * | 2/2001 | Okamoto et al. | 428/64.7 |
| 6,303,735 B1 | 10/2001 | Shimoda et al. | |

FOREIGN PATENT DOCUMENTS

| | | |
|---|---|---|
| EP | 0 890 944 A | 1/1999 |
| JP | 08003304 A | 1/1996 |
| JP | 1996003304 A | 1/1996 |
| JP | 10158499 | 6/1998 |
| JP | 11035671 | 2/1999 |
| JP | 11300842 | 11/1999 |
| WO | WO 96/28493 | 9/1996 |

OTHER PUBLICATIONS

Takahiro, et al., Publication No. Japanese 2001–213953, Publication Date: Aug. 7, 2001, Abstract Only, 1 pg.
Hiroshi, et al., Publication No. Japanese 2001–338436, Publication Date: Dec. 7, 2001, Abstract Only, 1 pg.
Masaaki, et al., Pubication No. Japanese 2002–184033, Publication Date: Jun. 28, 2002, Abstract Only, 1 pg.
Shinji, Publication No. Japanese 2002–187945, Publication Date: Jul. 5, 2002, Abstract Only, 2 pgs.

* cited by examiner

*Primary Examiner*—Terressa Boykin

(57) ABSTRACT

This specification describes an optical polycarbonate composition obtained by the melt polycondensation of a bisphenol and a carbonic diester in the presence of an alkaline compound catalyst, wherein said optical polycarbonate composition comprises (i) a compound expressed by the following Formula [A] in an amount of 30 to 2000 ppm; (ii) a compound expressed by the following Formula [B] in an amount of 30 to 4000 ppm; and (iii) a compound expressed by the following Formula [C] in an amount of 80 to 8000 ppm. The polycarbonate composition has a viscosity average molecular weight of between 12,000 and 18,000, and the portion with a molecular weight (as measured by GPC) of 1000 or less accounts for 0.5 to 1.5 wt %.

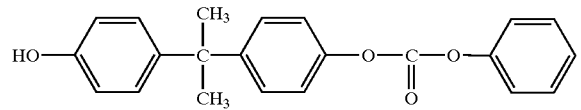

[A]

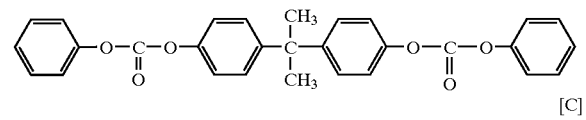

[B]

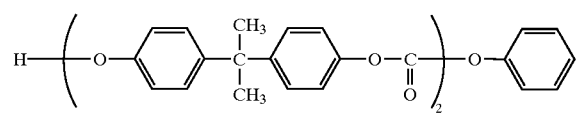

[C]

4 Claims, No Drawings

OPTICAL POLYCARBONATE AND APPLICATIONS THEREOF

The present application is a U.S. non-provisional application based upon and claiming priority from Japanese Application No. 2001-159441, with a filing date of May 28, 2001, which is hereby incorporated by reference.

DETAILED DESCRIPTION OF THE INVENTION

TECHNOLOGICAL FIELD OF THE INVENTION

The present invention relates to an optical polycarbonate, and more specifically relates to an optical polycarbonate that has excellent color stability and moldability, and is particularly well suited to use in optical disk substrates.

TECHNOLOGICAL BACKGROUND TO THE INVENTION

Polycarbonates have excellent impact resistance and other mechanical properties, and furthermore have excellent heat resistance, transparency, and so on, and are therefore widely used in various applications such as mechanical parts, optical disks, and automobile parts. They hold particularly great promise in optical applications such as optical memory disks, optical fibers, and lenses, and considerable research has been conducted in this area.

Known methods for manufacturing a polycarbonate include a method in which a bisphenol such as bisphenol A is directly reacted with phosgene (interfacial method), and a method in which a bisphenol such as bisphenol A is subjected to a melt polycondensation reaction (ester interchange reaction) with a carbonic diester such as diphenyl carbonate.

Of these, the interfacial method using phosgene entails the use of a large quantity of a solvent such as methylene chloride, and the removal of the chlorine is extremely difficult, so the product is not necessarily favorable for use as an optical polycarbonate.

Meanwhile, a melt polycondensation reaction method has the advantage of allowing a polycarbonate to be manufactured at a lower cost than an interfacial method. Also, no phosgene or other such toxic substances are used, nor is any solvent such as methylene chloride required, so this method is very promising as a way to manufacture optical polycarbonates.

It is considered very important, though, that a polycarbonate used in optical disk materials have a low molecular weight and that [this molecular weight] be adjusted to within a narrow range in order to maintain the strength of the molded disk and to transfer fine pits, crepe, and so forth to the surface during injection molding.

However, even when a polycarbonate with a low molecular weight is used, as discussed in Japanese Laid-Open Patent Application H11-300842, for instance, the molding has to be conducted under extremely limited conditions, in which the difference between the glass transition temperature of the polycarbonate resin and the mold temperature setting on the side where the stamper is installed is between 0 and 7° C., and this is unsatisfactory in terms of being suited to mass production.

Japanese Laid-Open Patent Application H11-35671 discloses an attempt at improving transfer during injection molding, in which a low molecular weight compound expressed by the following formula is added in an amount of 3.5 to 8 wt % to an optical polycarbonate. Copolymerizing a polycarbonate with a polysiloxane compound or the like has also been proposed, as discussed in Japanese Laid-Open Patent Application H10-158499.

Chemical Formula 4

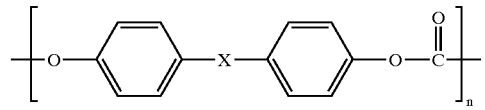

(In the formula, X is a $C_1$ to $C_4$ alkylene group, $C_2$ or $C_3$ alkylidene group, oxygen atom, sulfur atom, carbonyl group, sulfinyl group, or sulfone group, and n is an integer from 1 to 4.)

Nevertheless, problems encountered with a method in which a low molecular weight polycarbonate is combined with another compound are that there is an increase in gas generation during molding, more mold fouling occurs during continuous production, and productivity is too low. When a polysiloxane compound is copolymerized, the manufacture of the polycarbonate itself requires a tremendous investment outlay, and because of differences in the optical characteristics and moldability of the resulting copolymerized polycarbonate, conventional disk manufacturing equipment cannot be used, among the many other practical problems.

In light of this situation, the inventors conducted research aimed at solving the above problems, whereupon they arrived at the present invention upon discovering that an optical polycarbonate that has excellent moldability and color stability, and that also affords excellent transfer in the injection molding of an optical disk can be obtained by adding a low molecular weight component (molecular weight of 1000 or less) in an amount of 1 wt % or less to a polycarbonate obtained by melt polycondensation, and adding a specific carbonate oligomer in a specific amount.

OBJECT OF THE INVENTION

The present invention was conceived in light of the above prior art, and it is an object thereof to provide an optical polycarbonate that has excellent moldability and color stability at high temperature as well as applications for this optical polycarbonate.

SUMMARY OF THE INVENTION

The optical polycarbonate (resin composition) pertaining to the present invention is:

an optical polycarbonate obtained by the melt polycondensation of a bisphenol and a carbonic diester in the presence of an alkaline compound catalyst, wherein in that:
(i) a compound expressed by the following Formula [A] is contained in an amount of 30 to 2000 ppm;

Chemical Formula 5

[A]

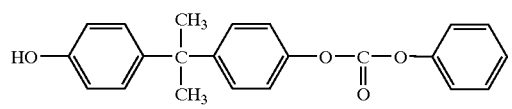

(ii) a compound expressed by the following Formula [B] is contained in an amount of 30 to 4000 ppm;

Chemical Formula 6

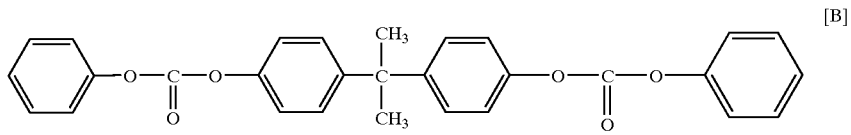
[B]

(iii) a compound expressed by the following Formula [C] is contained in an amount of 80 to 8000 ppm;

Chemical Formula 7

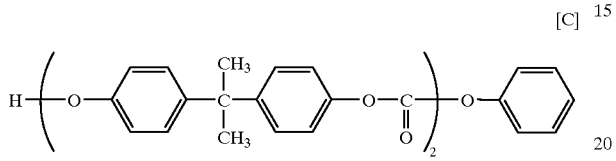
[C]

(iv) the viscosity average molecular weight is between 12,000 and 18,000; and (v) the portion with a molecular weight (as measured by GPC) of 1000 or less accounts for 0.5 to 1.5 wt %.

The glass transition temperature of the optical polycarbonate should be 147° C. or lower.

It is preferable if the bisphenol is substantially composed of bisphenol A.

The optical disk pertaining to the present invention is formed from the above-mentioned optical polycarbonate.

Specific Description of the Invention

The optical polycarbonate pertaining to the present invention will now be described in specific terms.

Optical Polycarbonate

The optical polycarbonate resin pertaining to the present invention is an optical polycarbonate obtained by the melt polycondensation of a bisphenol and a carbonic diester in the presence of an alkaline compound catalyst.

The optical polycarbonate pertaining to the present invention usually has a viscosity average molecular weight (iv) between 12,000 and 18,000, and preferably between 13,000 and 17,000. The viscosity average molecular weight is calculated from the following equation after using an Ostwald viscometer to measure the intrinsic viscosity (IV) of a solution in which methylene chloride is used as a solvent.

$$\text{Viscosity average molecular weight} = (IV \times 10,000/1.23)^{1/0.83}$$

An optical polycarbonate having this viscosity average molecular weight will have little optical distortion, and will also have excellent strength. There will be a sharp drop in strength if the viscosity average molecular weight is less than 12,000. If the viscosity average molecular weight is over 18,000, though, the transfer of fine pits, crepe, and so forth to the surface will be inadequate during optical disk injection molding.

The optical polycarbonate pertaining to the present invention contains (i) a compound expressed by the following Formula [A] in an amount of 30 to 2000 ppm, and preferably in an amount of 50 to 2000 ppm.

Chemical Formula 8

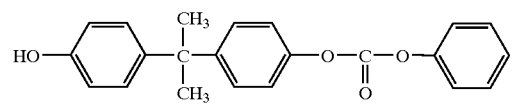
[A]

The optical polycarbonate pertaining to the present invention contains (ii) a compound expressed by the following Formula [B] in an amount of 30 to 4000 ppm, and preferably in an amount of 50 to 3000 ppm.

Chemical Formula 9

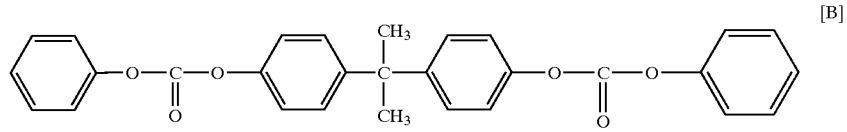
[B]

The optical polycarbonate pertaining to the present invention contains (iii) a compound expressed by the following Formula [C] in an amount of 80 to 8000 ppm, and preferably in an amount of 100 to 5000 ppm.

Chemical Formula 10

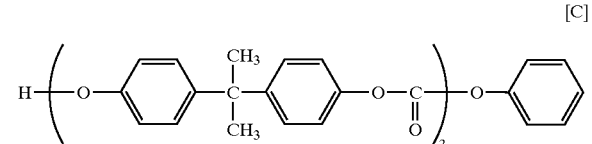
[C]

The low molecular weight oligomer components expressed by [A] to [C] are quantified by liquid chromatography or the like.

If, as in the present invention, an optical polycarbonate contains low molecular weight oligomer components expressed by [A] to [C] in amounts within the above ranges, then fine pits, crepe, and so forth can be transferred precisely and uniformly to the surface during injection molding.

With the optical polycarbonate pertaining to the present invention, (v) the portion with a molecular weight (as measured by GPC) of 1000 or less accounts for 0.5 to 1.5 wt %, and preferably 0.5 to 0.8 wt %. The molecular weight is measured by GPC as follows. Using chloroform as the eluant, and using a monodisperse polystyrene of known molecular weight as the standard substance, the weight percentage of [the component] with a molecular weight of 1000 or less is calculated and termed the portion with a molecular weight of 1000 or less.

If the low molecular weight components expressed by (i) to (iii) above are contained, and the portion with a molecular weight of 1000 or less is within the range given above, then fine pits, crepe, and so forth can be transferred precisely and uniformly to the surface during injection molding.

The glass transition temperature of the optical polycarbonate is 147° C. or lower, and preferably between 143 and 147° C. A low glass transition temperature such as this allows fine pits, crepe, and so forth to be transferred precisely and uniformly to the surface during injection molding.

The optical polycarbonate pertaining to the present invention can be manufactured by the melt polycondensation of a bisphenol and a carbonic diester in the presence of an alkaline compound catalyst.

Melt Polycondensation of Polycarbonate

A compound expressed by the following Formula I, for example, is used as the bisphenol used as a raw material in the melt polycondensation of the polycarbonate.

Chemical Formula 11

Chemical Formula 11

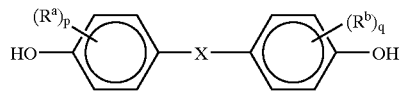

[I]

(In the formula, $R^a$ and $R^b$ may be the same or different, and are each a halogen atom or a monovalent hydrocarbon group, and p and q are integers from 0 to 4.

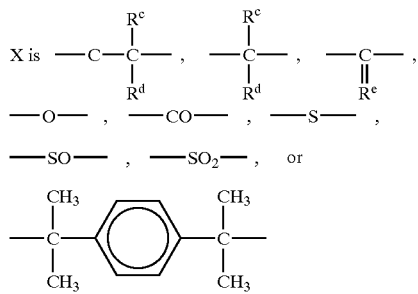

$R^c$ and $R^d$ are each a hydrogen atom or a monovalent hydrocarbon group, and may form a cyclic structure, and $R^e$ is a divalent hydrocarbon group.)

Specific examples of the bisphenols expressed by Formula [I] above include 1,1-bis(4-hydroxyphenyl)methane, 1,1-bis(4-hydroxyphenyl)ethane, 2,2-bis(4-hydroxyphenyl) propane (hereinafter referred to as bisphenol A), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, bis(4-hydroxyphenyl) phenylmethane, 2,2-bis(4-hydroxy-1-methylphenyl) propane, 1,1-bis(4-hydroxy-tert-butylphenyl)propane, 2,2-bis(4-hydroxy-3-bromophenyl)propane, and other such bis(hydroxyaryl)alkanes; and 1,1-bis (hydroxyphenyl) cyclopentane, 1,1-bis(4-hydroxyphenyl)cyclohexane, and other such bis-(hydroxyaryl)cycloalkanes.

Other examples with the present invention are bisphenols in which X in the above formula is —O—, —CO—, —S—, —SO—, or —SO$_2$—, including bis(hydroxyaryl) ethers such as 4,4'-dihydroxydiphenyl ether and 4,4'-dihydroxy-3, 3'-dimethylphenyl ether; bis(dihydroxydiaryl) sulfides such as 4,4'-dihydroxydiphenyl sulfide and 4,4'-dihydroxy-3,3'-dimethyldiphenyl sulfide; bis(hydroxydiaryl) sulfoxides such as 4,4'-dihydroxydiphenyl sulfoxide and 4,4'-dihydroxy-3,3'-dimethyldiphenyl sulfoxide; and bis(hydroxydiarylsulfones) such as 4,4'-dihydroxydiphenylsulfone and 4,4'-dihydroxy-3,3'-dimethyldiphenyl-sulfone.

Compounds expressed by the following Formula [1] can also be used as bisphenols.

Chemical Formula 12

[II]

(In the formula, $R^f$ is a halogen atom, a $C^1$ to $C_{10}$ hydrocarbon group, or a halogenated hydrocarbon group, and n is an integer from 0 to 4. When n is greater than or equal to 2, the $R^f$ groups may be the same or different.)

Specific examples of bisphenols expressed by this Formula [II] include resorcinol; substituted resorcinols such as 3-methylresorcinol, 3-ethylresorcinol, 3-propylresorcinol, 3-butylresorcinol, 3-tert-butylresorcinol, 3-phenylresorcinol, 3-cumylresorcinol, 2,3,4,6-tetrafluororesorcinol, and 2,3,4,6-tetrabromoresorcinol; catechol; and hydroquinone and substituted hydroquinones such as 3-methylhydroquinone, 3-ethylhydroquinone, 3-propylhydroquinone, 3-butylhydroquinone, 3-tert-butylhydroquinone, 3-phenylhydroquinone, 3-cumylhydroquinone, 2,3,5,6-tetramethylhydroquinone, 2,3,5,6-tetra-tert-butylhydroquinone, 2,3,5,6-tetrafluorohydroquinone, and 2,3,5,6-tetrabromohydroquinone.

Another bisphenol that can be used is the 2,2,2',2'-tetrahydro-3,3,3',3'-tetramethyl-1,1'-spirobi-[1H-inden]-6, 6'-diol expressed by the following formula.

Chemical Formula 13

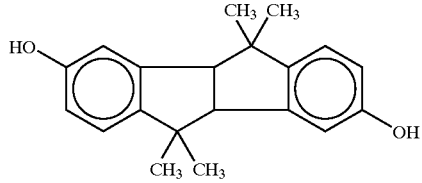

Of these, a bisphenol expressed by the above Formula [1] is preferred. With the optical polycarbonate pertaining to the present invention, it is particularly desirable for the bisphenol to be substantially composed of only bisphenol A.

Specific examples of carbonic diesters that can be used include diphenyl carbonate, ditolyl carbonate, bis (chlorophenyl) carbonate, m-cresyl carbonate, dinaphthyl carbonate, bis(diphenyl) carbonate, diethyl carbonate, diethyl carbonate, dibutyl carbonate, and dicyclohexyl carbonate. A combination of two or more of these can also be used. Of these, the use of diphenyl carbonate is particularly favorable.

This carbonic diester may also contain a dicarboxylic acid or dicarboxylic ester. More specifically, the carbonic diester preferably contains a dicarboxylic acid or dicarboxylic ester in an amount of 50 mol % or less, and even more preferably 30 mol % or less.

Examples of dicarboxylic acids and dicarboxylic esters include terephthalic acid, isophthalic acid, diphenyl terephthalate, diphenyl isophthalate, and other aromatic dicarboxylic acids; succinic acid, glutaric acid, adipic acid, pimelic acid, suberic acid, azelaic acid, sebacic acid, decanedioic acid, dodecandioic acid, diphenyl sebacate, diphenyl decanedioate, diphenyl dodecanedioate, and other aliphatic dicarboxylic acids; cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohextanedicarboxylic acid, 1,3-cyclohextanedicarboxylic acid, 1,4-cyclohextanedicarboxylic acid, diphenyl cyclopropanedicarboxylate, diphenyl 1,2-cyclobutanedicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate, diphenyl 1,4-cyclohexanedicarboxylate, and other alicyclic dicarboxylic acids. The carbonic diester may also contain two or more types of these dicarboxylic acids and dicarboxylic esters.

With the present invention, the bisphenol and the carbonic diester may be filtered ahead of time while in a molten state.

The above-mentioned carbonic diester and bisphenol are usually mixed such that there is 1.00 to 1.30 mol, and preferably 1.01 to 1.20 mol, of carbonic diester per mole of bisphenol.

An alkaline compound catalyst is included as a melt polycondensation catalyst in the course of the melt polycondensation of the carbonic diester and bisphenol. An alkali metal compound and/or an alkaline earth metal compound A (hereinafter referred to as the alkali (alkaline earth) metal compound A) is usually used as the alkaline compound catalyst.

It is preferable for the alkali (alkaline earth) metal compound A to be an organic acid salt, inorganic acid salt, oxide, hydroxide, hydride, alcoholate, or the like of an alkali metal or alkaline earth metal.

Specific examples of alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium boron hydride, potassium boron hydride, lithium boron hydride, sodium boron phenide, sodium benzoate, potassium benzoate, lithium benzoate, disodium hydrogenphosphate, dipotassium hydrogenphosphate, dilithium hydrogenphosphate, disodium salt, dipotassium salt, and dilithium salt of bisphenol A, and sodium salts, potassium salts, and lithium salts of bisphenols. Examples of alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate, and strontium stearate. Two or more of these compounds can also be used in combination.

These alkali (alkaline earth) metal compounds are preferably included in the melt polycondensation reaction in an amount of $1 \times 10^{-8}$ to $1 \times 10^{-3}$ mol, and preferably $1 \times 10^{-7}$ to $2 \times 10^{-6}$ mol, and even more preferably $1 \times 10^{-7}$ to $8 \times 10^{-7}$ mol, per mole of bisphenol. When an alkali (alkaline earth) metal compound is added in advance to the bisphenol used as a raw material in the melt polycondensation reaction, the added amount should be controlled so that the amount of alkali (alkaline earth) metal compound present during the melt polycondensation reaction will be within the above range per mole of bisphenol.

A basic compound B may be used in addition to the above-mentioned alkali (alkaline earth) metal compound A as the melt polycondensation catalyst. Examples of this basic compound B include nitrogen-containing basic compounds that are volatile or readily decompose at high temperature, specific examples of which are given below.

Ammonium hydroxides having alkyl, aryl, aralkyl, or other such groups, such as tetramethylammonium hydroxide ($Me_4NOH$), tetraethylammonium hydroxide ($Et_4NOH$), tetrabutylammonium hydroxide ($Bu_4NOH$), and trimethylbenzylammonium hydroxide;

tertiary amines such as trimethylamine, triethylamine, dimethylbenzylamine, and triphenylamine;

secondary amines expressed by $R_2NH$ (where R is a methyl, ethyl, or other alkyl, or a phenyl, toluyl, or other aryl group, for example);

primary amines expressed by $RNH_2$ (where R is defined the same as above);

pyridines such as 4-dimethylaminopyridine, 4-diethylaminopyridine, and 4-pyrrolidinopyridine;

imidazoles such as 2-methylimidazole and 2-phenylimidazole; and basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh$), and tetramethylammonium tetraphenylborate ($Me_4NBPh_4$).

Of these, the use of a tetraalkylammonium hydroxide is preferred.

The above-mentioned nitrogen-containing basic compound B can be used in an amount of $1 \times 10^{-6}$ to $1 \times 10^{-1}$ mol, and preferably $1 \times 10^{-5}$ to $1 \times 10^{-2}$ mol, per mole of the bisphenol.

A boric acid compound C can also be used as a catalyst.

Examples of this boric acid compound C include boric acid and boric esters.

Examples of boric esters include those expressed by the following general formula.

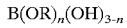

$$B(OR)_n(OH)_{3-n}$$

In the formula, R is a methyl, ethyl, or other alkyl, or a phenyl or other aryl, for example, and n is 1, 2, or 3.

Specific examples of these boric esters include trimethyl borate, triethyl borate, tributyl borate, trihexyl borate, triheptyl borate, triphenyl borate, tritolyl borate, and trinaphthyl borate.

This boric acid or boric ester C can be used in an amount of $1 \times 10^{-8}$ to $1 \times 10^{-1}$ mol, and preferably $1 \times 10^{-7}$ to $1 \times 10^{-2}$ mol, and even more preferably $1 \times 10^{-6}$ to $1 \times 10^{-4}$ mol, per mole of bisphenol.

With the present invention, it is preferable for the melt polycondensation catalyst to be prepared, for example, by combining an alkali (alkaline earth) metal compound A with a nitrogen-containing basic compound B, and even more preferably by combining an alkali (alkaline earth) metal compound A, a nitrogen-containing basic compound B, and a boric acid or boric ester C.

Using a combination of an alkali (alkaline earth) metal compound A with a nitrogen-containing basic compound B in the above amounts as the catalyst is preferable because it allows the polycondensation reaction to proceed at a satisfactory rate, allows a polycarbonate with a high molecular weight to be produced at a high polymerization activity.

When the alkali (alkaline earth) metal compound A and the nitrogen-containing basic compound B are used together, or when an alkali (alkaline earth) metal compound A, a nitrogen-containing basic compound B, and a boric acid or boric ester C are used together, the catalyst components may be added as a mixture to a molten mixture of a bisphenol and a carbonic diester, or these catalyst components may be added separately to a molten mixture of a bisphenol and a carbonic diester.

The above-mentioned bisphenol and carbonic diester are subjected to melt polycondensation in the presence of the above-mentioned melt polycondensation catalyst.

The polycondensation reaction of the bisphenol and carbonic diester can be conducted under the same conditions as conventionally employed in a polycondensation reaction. For instance, the reaction can be conducted in two stages.

More specifically, the first reaction stage involves reacting the bisphenol and carbonic diester under normal pressure for 0.01 to 5 hours, and preferably 0.01 to 4 hours, and even more preferably 0.01 to 3 hours, at a temperature of 80 to 250° C., and preferably 100 to 230° C., and even more preferably 120 to 190° C. The reaction temperature is then raised while the reaction system is put under reduced pressure, thereby reacting the bisphenol and the carbonic diester, and ultimately the polycondensation reaction between the bisphenol and the carbonic diester is conducted at 240 to 320° C. and no more than 5 mmHg, and preferably no more than 1 mmHg. The amounts of components A to C of the present invention can be adjusted by controlling the reaction conditions. In specific terms, they can be adjusted by controlling the activity of the polymerization catalyst at the reaction stage, the amount of unreacted monomer, and the reaction conditions.

If the low molecular weight oligomers expressed by Formulas A to C are contained in the resulting optical polycarbonate in amounts below the given ranges, more of the low molecular weight oligomers expressed by Formulas A to C may be added, and if the low molecular weight oligomers expressed by Formulas A to C are contained in amounts over the given ranges, then a separately manufactured polycarbonate may be admixed to bring the molecular weight and glass transition temperature within the above ranges, and to bring the contents of the low molecular weight oligomers expressed by Formulas A to C within their given ranges.

The above polycondensation reaction may be a continuous or batch process. The reaction apparatus used for conducting this reaction may be a tank type, tube type, or column type.

With the present invention, in the manufacture of the polycarbonate, a polyfunctional compound having three or more functional groups per molecule can be used along with the above-mentioned bisphenol and carbonic diester. This polyfunctional compound is preferably a compound having phenolic hydroxyl groups or carboxyl groups, and a compound having three phenolic hydroxyl groups is particularly favorable. Examples of this polyfunctional compound include 1,1,1-tris(4-hydroxyphenyl)ethane, 2,2',2"-tris(4-hydroxyphenyl)diisopropylbenzene, α-methyl-α,α',α'-tris(4-hydroxyphenyl)-1,4-diethylbenzene, α,α',α"-tris(4-hydroxyphenyl)-1,3,5-triisopropylbenzene, fluoroglycine, 4,6-dimethyl-2,4,6-tri(4-hydroxyphenyl)heptane-2,1,3,5-tri(4-hydroxyphenyl)benzene, 2,2-bis-[4,4-(4,4'-dihydroxyphenyl)-cyclohexyl]-propane, trimellitic acid, 1,3,5-benzenetricarboxylic acid, and pyromellitic acid.

Of these, the use of 1,1,1-tris(4-hydroxyphenyl)ethane, α,α',α"-tris(4-hydroxyphenyl)-1,3,5-triisopropylbenzene, or the like is preferable.

This polyfunctional compound is usually used in an amount of 0.03 mol or less, and preferably 0.001 to 0.02 mol or less, and even more preferably 0.001 to 0.01 mol or less, per mole of bisphenol.

In the manufacture of the polycarbonate, a terminal capping agent may be used along with the above-mentioned aromatic dihydroxy compound and carbonic diester. This terminal capping agent can be an aryloxy compound capable of introducing end groups expressed by the following General Formula III at the molecular terminals of the resulting polycarbonate.

$$ArO— \qquad [III]$$

In the formula, Ar is an aromatic hydrocarbon group with 6 to 50 carbon atoms. There are no particular restrictions on this aromatic hydrocarbon group, which may be a condensed ring of a phenyl group and a naphthyl group, anthranyl group, or the like, or may form a ring with one of these aromatic rings and a saturated hydrocarbon and/or a hetero atom. These aromatic rings may be substituted with a halogen or an alkyl group with one to nine carbon atoms.

Examples of this aryloxy compound include phenol, diphenyl carbonate, p-tert-butylphenol, p-tert-butylphenylphenyl carbonate, p-tert-butylphenyl carbonate, p-cumylphenol, p-cumylphenylphenyl carbonate, p-cumylphenyl carbonate, 2,2,4-trimethyl-4-(4-hydroxyphenyl)chroman, 2,2,4,6-tetramethyl-4-(3,5-dimethyl-4-hydroxyphenyl)chroman, 2,2,3-trimethyl-3-(4-hydroxyphenyl)chroman, 2,2,3,6-tetramethyl-3-(3,5-dimethyl-4-hydroxyphenyl)chroman, 2,4,4-trimethyl-2-(2-hydroxyphenyl)chroman, 2,4,4,6-tetramethyl-2-(3,5-dimethyl-2-hydroxyphenyl)chroman, and other chroman compounds.

The above-mentioned aryloxy compounds can be used singly or in combinations. This aryloxy compound usually should be used in an amount of 0.01 to 0.2 mol, and preferably 0.02 to 0.15 mol, and even more preferably 0.02 to 0.1 mol, per mole of aromatic dihydroxy compound.

When an aryloxy compound is used in the above amount as a terminal capping agent, the molecular terminals of the resulting polycarbonate will be capped by the end groups expressed by the above General Formula III in a proportion of 1 to 95%, and preferably 10 to 95%, and even more preferably 20 to 90%.

A polycarbonate in which the end groups expressed by the above General Formula [III] have thus been introduced in the above proportion will have excellent heat resistance, as well as excellent impact resistance and other mechanical properties at a low molecular weight.

With the present invention, an aliphatic monocarboxy compound capable of introducing aliphatic hydrocarbon units expressed by the following General Formula [IV] may be used as needed as a terminal capping agent along with the above-mentioned aryloxy compound.

Chemical Formula 14

[IV]

In the formula, R is an alkyl with 10 to 30 carbon atoms, may be linear or branched, and may be substituted with a halogen. Specific examples of such aliphatic monocarboxy compounds include undecanoic acid, lauric acid, tridecanoic acid, pentadecanoic acid, stearic acid, nonadecanoic acid, heneicosanoic acid, tricosanoic acid, melissic acid, and other alkylmonocarboxylic acids; and methyl stearate, ethyl stearate, phenyl stearate, and other alkylmonocarboxylic esters such as methyl esters, ethyl esters, and phenyl esters of the above-mentioned alkylmonocarboxylic acids.

These may be used singly or in combinations. The above-mentioned aliphatic monocarboxy compound usually should be used in an amount of 0.01 to 0.20 mol, and preferably 0.02 to 0.15 mol, and even more preferably 0.02 to 0.10 mol, per mole of the aromatic dihydroxy compound.

If the above-mentioned terminal capping agent is used in an amount over 0.2 mol per mole of combined aromatic dihydroxy compound, there may be a drop in the polymerization rate. The intrinsic viscosity of the reaction product (polycarbonate) obtained above, as measured in 20° C. methylene chloride, is usually 0.30 to 0.42 dL/g, and preferably 0.33 to 0.40 dL/g.

The melt flow rate of the reaction product (polycarbonate) manufactured as above should be 4 to 20 g/10 minutes, and preferably 6 to 15 g/10 minutes, as measured at a temperature of 250° C. and a load of 1.2 kg.

The above optical polycarbonate pertaining to the present invention may contain various additives as dictated by its intended use.

Additives

Examples of additives include (b) phosphorous acid, (c) sulfur-containing acidic compounds with a pKa value of no more than 3, and derivatives thereof, and (d) alcohol compounds containing ester groups.

The phosphorous acid (b) may be in the form of a sodium salt, potassium salt, or other salt. The amount in which this phosphorous acid (b) is added should be 0.1 to 10 ppm, and preferably 0.2 to 5 ppm, with respect to the optical polycarbonate. Adding the phosphorous acid (b) in this amount prevents various problems caused by heavy metal ions that are admixed as impurities into the optical polycarbonate.

Specific examples of the sulfur-containing acidic compounds with a pKa value of no more than 3 and derivatives thereof (c) (hereinafter referred to as the acidic compound (c)) include sulfurous acid, sulfuric acid, sulfinic acid-based compounds, sulfonic acid-based compounds, and derivatives of these. Examples of sulfurous acid derivatives include dimethylsulfurous acid, diethylsulfurous acid, dipropylsulfurous acid, dibutylsulfurous acid, and diphenylsulfurous acid.

Examples of sulfuric acid derivatives include dimethylsulfuric acid, diethylsulfuric acid, dipropylsulfuric acid, dibutylsulfuric acid, and diphenylsulfuric acid. Examples of sulfinic acid-based compounds include benzenesulfinic acid, toluenesulfinic acid, and naphthalenesulfinic acid.

Examples of sulfonic acid-based compounds and derivatives thereof include compounds expressed by the following General Formula V, and ammonium salts and phosphonium salts thereof.

Chemical Formula 15

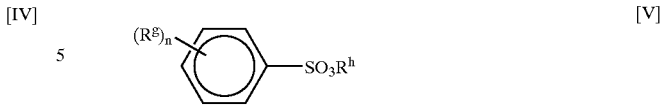

[V]

In the formula, $R^g$ is a $C_1$ to $C_{50}$ hydrocarbon group or halogen-substituted hydrocarbon group, $R^h$ is a hydrogen atom, $C_1$ to $C_{50}$ hydrocarbon group, or halogen-substituted hydrocarbon group, and n is an integer from 0 to 3.

The amount in which the above acidic compound (c) is added should be from 0.5 to 100 ppm, and preferably 1 to 50 ppm, with respect to the optical polycarbonate. Adding the acidic compound (c) in this amount suppresses coloration of the polycarbonate caused by heating during molding.

The acidic compound (c) may be added ahead of time at the final stage of the melt polycondensation, or it may be added once at the final stage of the melt polycondensation and then again as an additive.

If the acidic compound is added to the polycarbonate ahead of time at the final stage of the melt polycondensation, the alkaline metal compound of the catalyst remaining in the polycarbonate will be neutralized, or weakened [in alkalinity], the melt polycondensation reaction itself will stop, and the residence stability and water resistance of the ultimate polycarbonate will be further enhanced.

The alcohol compound containing an ester group (d) is a partial ester derived from a polyhydric alcohol and a monovalent fatty acid with 10 to 22 carbons, and can be, for example, a single partial ester derived from a polyhydric alcohol such as ethylene glycol, glycerol, or pentaerythritol, and a monovalent fatty acid with 10 to 22 carbons such as myristic acid, palmitic acid, stearic acid, oleic acid, behenic acid, or a fatty acid of sulfided fish oil, or a mixture of these partial esters. The esterification rate here should be from 10 to 80%, and preferably 20 to 60%, if we let 100% be the esterification rate when the polyhydric alcohol is completely esterified. This alcohol compound containing an ester group (d) may be either completely or partially condensed. The amount in which this alcohol compound containing an ester group (d) is added should be from 50 to 1000 ppm, and preferably 100 to 800 ppm, with respect to the polycarbonate A. The alcohol compound containing an ester group (d) functions as a release agent for the optical polycarbonate, and when this ester group-containing alcohol compound is contained, the molded article releases well during molding, and productivity is higher. If the alcohol compound containing an ester group (d) is added in an amount less than 50 ppm, release will not be as good after melt molding, and optical distortion caused by release strain or clouding of the molded article may occur, but if the amount is over 1000 ppm, pyrolysis and volatilization during melt molding may produce silver streaks on the molded article, or result in substrate or stamper fouling.

Examples of phosphorous esters include compounds expressed by the following general formula.

(In the formula, R is an alicyclic hydrocarbon group or aromatic hydrocarbon group, and the R groups may be the same or different.)

Examples of compounds expressed by the above formula include trimethyl phosphite, triethyl phosphite, tributyl phosphite, trioctyl phosphite, tris(2-ethylhexyl) phosphite, trinonyl phosphite, tridecyl phosphite, trioctadecyl phosphite, tristearyl phosphite, tris(2-chloroethyl) phosphite, tris(2,3-dichloropropyl) phosphite, and other trialkyl phosphites; tricyclohexyl phosphite and other tricycloalkyl phosphites; triphenyl phosphite, tricresyl phosphite, tris(ethylphenyl) phosphite, tris(2,4-di-tert-butylphenyl) phosphite, tris(nonylphenyl) phosphite, tris(hydroxyphenyl) phosphite, and other triaryl phosphites; and phenyl didecyl phosphite, diphenyl decyl phosphite, diphenyl isooctyl phosphite, phenyl isooctyl phosphite, 2-ethylhexyl diphenyl phosphite, and other aryl alkyl phosphites.

Other examples of phosphorous esters include distearyl pentaerythrityl diphosphite and bis(2,4-di-tert-butylphenyl) pentaerythrityl diphosphite. Two or more of these can also be used together.

Of these, a phosphorous ester expressed by the above general formula or trimethyl phosphate is preferred, an aromatic phosphorous ester is even more preferable, and tris(2,4-di-tert-butylphenyl) phosphite is particularly favorable.

The amount in which this component (e) is added should be 10 to 1000 ppm, and preferably 30 to 300 ppm, with respect to the polycarbonate.

Furthermore, in the present invention, additives (f) other than the above-mentioned (b) to (e) (hereinafter referred to as other additives (f)) may be added to the polycarbonate resin composition to the extent that the object of the present invention is not compromised. Any of the many different additives commonly added to polycarbonates can be used as the other additives (f) according to the intended use, examples of which include thermal stabilizers, epoxy compounds, UV absorbents, release agents, colorants, antistatic agents, slip agents, anti-blocking agents, lubricants, anti-clouding agents, natural oils, synthetic oils, waxes, organic fillers, and inorganic fillers.

These additives (b) to (f) should be added and kneaded while the optical polycarbonate is still in a molten state.

The above optical polycarbonate pertaining to the present invention is particularly suitable as a material for molding optical disks.

Optical Disk Substrate

The optical disk substrate of the present invention is formed from the above-mentioned optical polycarbonate. Any known injection molding method can be employed for this molding, a specific example of which is manufactured by the injection compression process.

An injection compression process comprises a mold closure step in which a thin disk of pure nickel (called a stamper) engraved on the surface with information to be transferred to the optical disk substrate is installed and the mold is closed; an injection step in which a polycarbonate resin having the requisite properties is injected; a pressure holding step in which an injection cylinder is operated for a specific length of time after the injection in order to maintain the pressure; a cooling step in which cooling is performed without halting the operation of the injection cylinder or decreasing the mold closure pressure; and a mold opening step in which the operation of the mold closure cylinder is halted, the mold is opened, and an optical disk substrate onto which the information of the stamper has been transferred is taken out as an injection molded article.

When the above optical polycarbonate pertaining to the present invention is used, the mold temperature on the side where the stamper is installed is set to between 50 and 130° C., a constant mold closure pressure is maintained in the cooling step upon completion of the injection step and the pressure holding step, and preferably the mold closure pressure is set to at least 20 tons and held for at least 3 seconds from the start of cooling, which yields an optical disk substrate on which the transfer is good all the way to the outermost edges of the substrate. Transfer is excellent when the optical polycarbonate pertaining to the present invention is used, even when it is molded at a low temperature.

The optical disk substrate that has been removed from the mold after the above injection molding can have a recording layer or reflective layer formed on its surface, over which a protective film can be formed, and a number of substrates can be stuck together as needed to produce an optical disk. The recording layer may be formed using a metal material (such as one based on tellurium or thallium) or an organic material (such as a cyanine dye or naphthoquinone dye). The reflective layer can be formed by vapor depositing a thin film of aluminum or the like, and the protective layer by applying a known material and then curing this coating through a curing reaction.

Examples of the optical disk substrate pertaining to the present invention include substrates for a CD, CD-ROM, CD-R, opto-magnetic disk, phase changing disk, DVD-ROM, DVD-R, DVD-RAM, DVD-RW, and so forth.

The above optical polycarbonate pertaining to the present invention is useful in the molding of substrates with a high recording density, in which the groove depth is at least 50 nm and the groove pitch is no more than 0.85 $\mu$m, and particularly in the molding of a DVD-R, DVD-RAM, or DVD-RW. The individual substrates that are stuck together are usually 0.6 mm thick.

Effect of the Invention

The present invention yields an optical polycarbonate that has excellent moldability and excellent color stability during molding, and that is favorable as an optical material, and particularly an optical disk molding material.

In particular, the optical polycarbonate pertaining to the present invention contains specific amounts of specific low molecular weight components, and therefore has excellent moldability and color stability, and allows fine pits, crepe, and so forth to be transferred precisely and uniformly to the surface in the injection molding of an optical disk substrate.

EXAMPLES

The present invention will now be described in further detail through examples, but is not limited to or by these examples.

Example 1

Melt Polycondensation of Polycarbonate 0.44 kmol of bisphenol A (made by GE Plastics Japan; chlorine 0.1 ppm or less, iron 0.1 ppm or less, sodium 0.1 ppm or less, sulfur 0.1 ppm or less) and 0.449 kmol of diphenyl carbonate (made by Eni [uncertain spelling]; chlorine 0.1 ppm or less, iron 0.1 ppm or less, sodium 0.1 ppm or less, sulfur 0.1 ppm or less) that had each been filtered through a 0.2 pm filter were put into a 250 L first stirring tank and melted at 140° C. Bisphenol A and diphenyl carbonate were fed in at rates of 0.16 kmol and 0.163 kmol per hour, respectively, while the level was kept constant in the first stirring tank, and meanwhile this mixed solution was pumped to a 50 L second stirring tank at a rate of 0.16 kmol per hour (calculated on the basis of the bisphenol A).

The temperature was held at 180° C. in the second stirring tank. Tetramethyl ammonium hydroxide and sodium hydroxide were added as catalysts to this second stirring tank in amounts of 0.04 mol per hour and 0.00016 mol per hour ($1 \times 10^{-6}$ mol per mole of bisphenol A), respectively, and the contents were stirred for a residence time of 30 minutes, thereby conducting a polycarbonate melt polycondensation reaction.

This reaction solution was then pumped to a 50 L third stirring tank (temperature: 210° C., pressure: 200 mmHg) at a rate of 0.16 kmol per hour (calculated on the basis of the bisphenol A). The residence time in the third stirring tank was adjusted to 30 minutes, and the phenol was distilled off under stirring.

Next, this reaction solution was pumped to a 50 L fourth stirring tank (temperature: 240° C., pressure: 15 mmHg) at a rate of 0.16 kmol per hour (calculated on the basis of the bisphenol A). The residence time in the fourth stirring tank was adjusted to 30 minutes, and the phenol was distilled off under stirring. The intrinsic viscosity (η) of the reaction product (polycarbonate) obtained from a steady state reaction was 0.15 dL/g.

The pressure of this reaction product was then raised with a gear pump, the reaction product was pumped to a centrifugal thin film evaporator at a rate of 0.16 kmol per hour (calculated on the basis of the bisphenol A), and the reaction was allowed to proceed further. The temperature and pressure of the thin film evaporator were kept to 270° C. and 2 mmHg, respectively.

The reaction product (polycarbonate) produced in the thin film evaporator and sodium p-toluenesulfonate (in an amount of 1 ppm with respect to the reaction product (polycarbonate)) were each fed by gear pump from the lower part of the evaporator at a rate of 0.16 kmol per hour (approximately 40 kg per hour) (calculated on the basis of the bisphenol A) into a biaxial stirring polymerization tank (L/D=3, stirring impeller rotating diameter 220 mm, internal volume 80 L) adjusted to 270° C. and 0.2 mmHg, and polymerization was conducted at a residence time of 30 minutes. The intrinsic viscosity (IV) of the polymer here was 0.35 dL/g.

The amount of the compound expressed by Formula [A] in the resulting polycarbonate was 270 ppm with respect to the polycarbonate, the amount of the compound expressed by Formula [B] was 1270 ppm with respect to the polycarbonate, and amount of the compound expressed by Formula [C] was 1370 ppm with respect to the polycarbonate. The portion with a molecular weight of 1000 or less accounted for 0.89 wt %.

Addition of Additives

The polycarbonate composition thus obtained was sent by gear pump to a biaxial extruder while still molten. At the same time, 100 ppm tris(2,4-di-tert-butylphenyl) phosphite and 400 ppm glycerol monostearate (hereinafter referred to as GMS) (amounts are with respect to the carbonate) were added and melt kneaded, after which the mixture was extruded from an extruder to obtain pellets of an optical polycarbonate.

Transfer

A CD-R (120 mm in diameter) was produced using the optical polycarbonate composition pellets obtained above, and the transfer was evaluated. The molding method involved using a disk molding machine (SD-30 made by Sumitomo Heavy Industries) and a CD-R stamper, and with the pit depth set to 1700 Å. The mold temperature was 116° C.

The groove depth of the obtained substrate was measured at points 24, 34, 45, 55, and 57 mm in the radial direction using an AFM. These results are given in Table 1.

Example 2

Optical polycarbonate pellets were manufactured and evaluated in the same manner as in Example 1 except that the conditions under which the polycarbonate was prepared in Example 1 were changed such that the diphenyl carbonate was used in a molar ratio of 1.05 with respect to the bisphenol A, that is, the amount supplied to the 250 L first stirring tank was 0.462 kmol and the feed amount was 0.168 kmol.

The results are given in Table 1.

Comparative Example 1

100 ppm tris(2,4-di-tert-butylphenyl) phosphite and 400 ppm GMS were added to a polycarbonate powder with a viscosity average molecular weight of 15,500, and these components were kneaded in a biaxial extruder to obtain pellets. The polycarbonate used in Comparative Example 1 did not contain the compounds expressed by Formulas [A] to [C].

TABLE 1

|  | Example 1 | Example 2 | Comparative Example 1 |
|---|---|---|---|
| Polycarbonate |  |  |  |
| Viscosity average molecular weight | 15,500 | 15,500 | 15,500 |
| Component A content | 270 | 110 | 0 |
| Component B content | 1,270 | 1,940 | 0 |
| Component C content | 1,370 | 530 | 0 |
| Content of portion with molecular weight under 1,000 | 0.89 | 0.8 | 0.68 |
| Mold temperature (° C.) | 116 | 116 | 116 |
| Transfer |  |  |  |
| R24 | 1,674 | 1,680 | 1,635 |
| R34 | 1,667 | 1,677 | 1,677 |
| R45 | 1,662 | 1,659 | 1,59 |
| R55 | 1,626 | 1,600 | 1,599 |
| R57 | 1,593 | 1,585 | 1,505 |
| Inner and outer difference | 81 | 95 | 130 |

The components A to C contents are given in units of ppm.

Grooves are formed all the way around the produced CD-R substrate for the accurate recording of information, and since the transfer is excellent with the optical polycarbonates used in Examples 1 and 2, the shape of the grooves is uniform over the entire surface, there is little inner and outer difference, and [the information] can be transferred even at a low temperature. Therefore, the optical polycarbonates of Examples 1 and 2 are favorable as polycarbonates for use in optical disks.

What is claimed is:

1. An optical polycarbonate composition obtained by the melt polycondensation of a bisphenol and a carbonic diester in the presence of an alkaline compound catalyst, wherein said optical polycarbonate composition comprises:

(i) a compound expressed by the following Formula [A] in an amount of 30 to 2000 ppm;

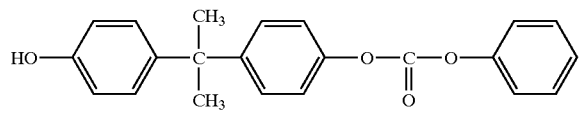

[A]

(ii) compound expressed by the following Formula [B] in an amount of 30 to 4000 ppm;

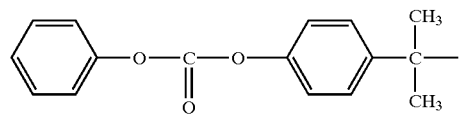
[B]

(iii) a compound expressed by the following Formula [C] in an amount of 80 to 8000 ppm;

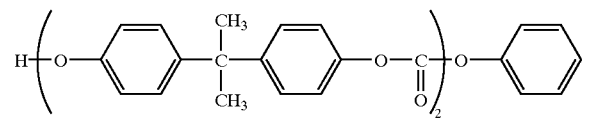
[C]

wherein, the viscosity average molecular weight of the composition is between 12,000 and 18,000; and the portion of said composition with a molecular weight (as measured by GPC) of 1000 or less is between 0.5 and 1.5 wt %.

2. The optical polycarbonate composition according to claim 1, wherein the glass transition temperature of the polycarbonate is 147° C. or lower.

3. The optical polycarbonate composition according to claim 1, wherein the bisphenol is substantially composed of bisphenol A.

4. An optical disk substrate comprising the optical polycarbonate composition according claim 1.

* * * * *

UNITED STATES PATENT AND TRADEMARK OFFICE
CERTIFICATE OF CORRECTION

PATENT NO. : 6,790,927 B2 Page 1 of 1
APPLICATION NO. : 10/117756
DATED : September 14, 2004
INVENTOR(S) : Kazushige Inoue and Tomoaki Shimoda It is certified that error appears in the above-identified patent and that said Letters Patent is hereby corrected as shown below:

In Claim 1, Formula [B] in (ii). which reads as

"  "

should read as --  --.

Signed and Sealed this

Twenty-fourth Day of April, 2007

JON W. DUDAS
*Director of the United States Patent and Trademark Office*